United States Patent
Huang et al.

(10) Patent No.: US 9,396,519 B2
(45) Date of Patent: Jul. 19, 2016

(54) CONTENT AWARE VIDEO RESIZING

(71) Applicants: Chao Huang, Shanghai (CN); Song Zhikai, North Shanghai (CN); Zhang Yong, Shanghai (CN)

(72) Inventors: Chao Huang, Shanghai (CN); Song Zhikai, North Shanghai (CN); Zhang Yong, Shanghai (CN)

(73) Assignee: Intel Corporation, Santa Clara, CA (US)

(*) Notice: Subject to any disclaimer, the term of this patent is extended or adjusted under 35 U.S.C. 154(b) by 472 days.

(21) Appl. No.: 13/976,983

(22) PCT Filed: Dec. 17, 2012

(86) PCT No.: PCT/CN2012/086756
§ 371 (c)(1),
(2) Date: Jun. 27, 2013

(87) PCT Pub. No.: WO2014/094203
PCT Pub. Date: Jun. 26, 2014

(65) Prior Publication Data
US 2015/0302551 A1 Oct. 22, 2015

(51) Int. Cl.
G06K 9/32 (2006.01)
G06T 3/40 (2006.01)
H04N 1/393 (2006.01)
G06T 3/00 (2006.01)
G06K 9/62 (2006.01)
G06T 7/00 (2006.01)

(52) U.S. Cl.
CPC ............... *G06T 3/40* (2013.01); *G06K 9/6202* (2013.01); *G06T 3/0012* (2013.01); *G06T 3/403* (2013.01); *G06T 3/4007* (2013.01); *G06T 3/4023* (2013.01); *G06T 3/4053* (2013.01); *G06T 7/0085* (2013.01); *H04N 1/393* (2013.01); *H04N 1/3935* (2013.01); *G06T 2207/10016* (2013.01)

(58) Field of Classification Search
USPC .......... 382/276, 293, 298–300; 348/445, 581; 358/451; 345/472, 660; 715/815
See application file for complete search history.

(56) References Cited

U.S. PATENT DOCUMENTS

| 7,747,107 | B2* | 6/2010 | Avidan | G06T 3/0012 382/298 |
| 7,873,211 | B1 | 1/2011 | Grundmann | |
| 8,280,186 | B1* | 10/2012 | Avidan | G06T 3/0012 382/293 |
| 8,380,010 | B2* | 2/2013 | Rubenstein | G06T 3/0012 382/299 |
| 8,717,390 | B2* | 5/2014 | Gross | G06T 3/0012 345/660 |
| 2011/0182502 | A1* | 7/2011 | Liang | G06T 3/4007 382/298 |

FOREIGN PATENT DOCUMENTS

| CN | 10177175 A | 7/2010 |
| CN | 101777175 | 7/2010 |

OTHER PUBLICATIONS

Michael Rubinstein, Ariel Shamir and Shai Avidan, "Improved Seam Carving for Video Retargeting", ACM Transactions on Graphics, vol. 27, Issue 3, Article 16, Aug. 2008, pp. 16:1-16:9.*
Written Opinion of the International Searching Authority for International application No. PCT/CN2012/086756.
PCT Search Report, PCT/CN2012/086756, Int. Filing date Dec. 17, 2012, Intel Corporation, Mailing date Sep. 26, 2013, 10 pages.

* cited by examiner

*Primary Examiner* — Eric Rush
(74) *Attorney, Agent, or Firm* — Blakely, Sokoloff, Taylor & Zafman LLP

(57) ABSTRACT

Content aware video resizing is described. In one example, edge detection is done on pixel values of video frames. The edges are compared and an energy is determined for lines of pixels of a second frame based on the comparison. The low energy lines are selected, and the frame is resized using the selected lines. The lines correspond to either rows or columns and the resizing may be done by adding or removing columns or by adding or removing rows.

22 Claims, 13 Drawing Sheets

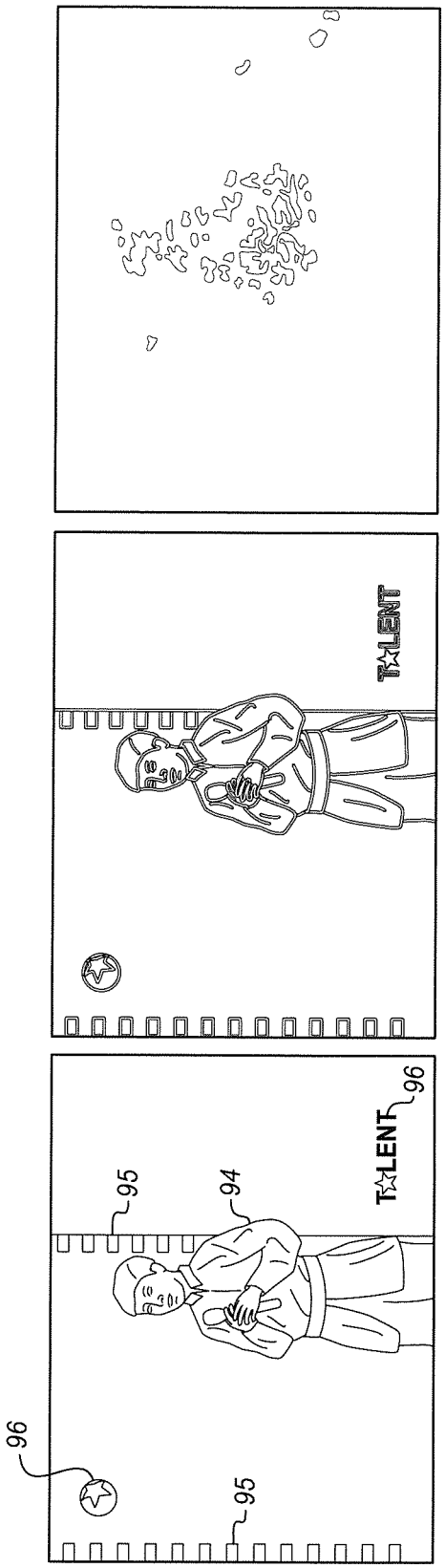

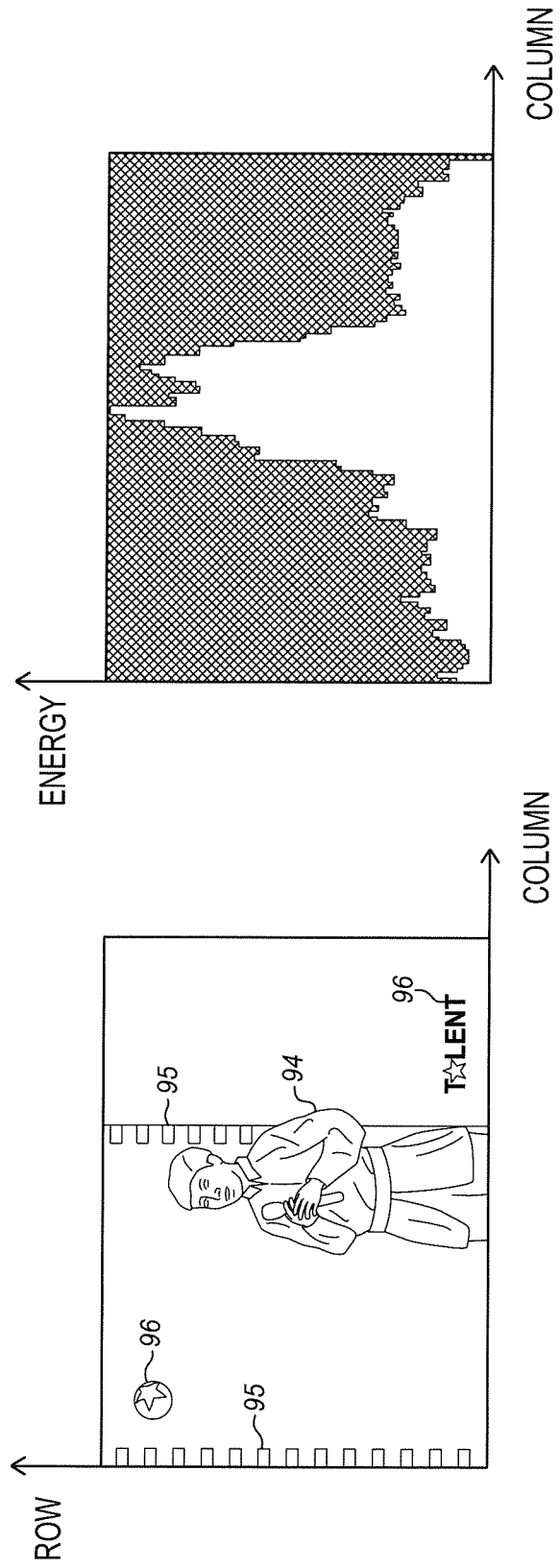

|  | Column i-1 | | Column i | Column i+1 | | |
|---|---|---|---|---|---|---|
| Before Adjust | f(m) | ... | f(i-1) | f(i) | f(i+1) | |

142

|  |  |  |  |  |  |  |
|---|---|---|---|---|---|---|
| Adjusted | f(m) | ... | f(i-1) Raised | f(i)=Max | f(i+1) Raised | |

| Process List | COLUMN M | COLUMN N | ... | ... | ... | |
|---|---|---|---|---|---|---|

120

M-1　M　M+1

| | | | | | | | |
|---|---|---|---|---|---|---|---|
| 100 | 20 | 200 | | | | | |
| 50 | 10 | 70 | | | | ... | ... |
| 130 | 130 | ... | | | | ... | ... |
| | ... | | | | | ... | ... |

Picture before Stretch — 126

M'　M"

| | | | | | | | |
|---|---|---|---|---|---|---|---|
| 100 | 60 | 110 | 200 | | | | |
| 50 | 30 | 40 | 70 | | | ... | ... |
| 130 | 130 | ... | ... | | | ... | ... |
| | ... | | | | | ... | ... |

Picture after Stretch — 128

FIG. 15

CONTENT AWARE VIDEO RESIZING

CROSS-REFERENCE TO RELATED APPLICATION

This patent application is a U.S. National Phase Application under 35 U.S.C. §371 of International Application No. PCT/CN2012/086756, filed Dec. 17, 2012, entitled "CONTENT AWARE VIDEO RESIZING".

FIELD

The present description relates to resizing video to accommodate different aspect ratios and, in particular, to resizing with awareness of the content of the video.

BACKGROUND

The production and publication of video continues to increase as video cameras become less expensive and video hosting and distribution services continue to expand. At the same time, there are many different devices upon which video is consumed. Screen resolutions and aspect ratios vary widely among different devices and often do not correlate to video resolution and screen sizes.

In order to display video on screens with different resolutions and aspect ratios, simple algorithms are often used to stretch or compress the video to fit the screen. However, the distortion caused by these changes can make the video dissatisfying to watch. More frequently, pillars or bars are used so that the video can be displayed on the screen in its original format. This can also be dissatisfying to watch give the impression that the screen is not being fully used. A video with 480 lines, if shown on 480 lines of a 1080 line display will appear very small. Even if the lines (and columns) are doubled, the video will fill only 960 lines creating a significant border on the screen surrounding the video.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 3-1 is a diagram of an original source video frame.

FIG. 3-2 is a diagram of a stretched version of the original source video frame using linear interpolation.

FIG. 4-1 is the diagram of the original source video frame of FIG. 3-1.

FIG. 4-2 is a diagram of a stretched version of the original source video frame according to an embodiment of the invention.

FIG. 9 is a table of Sobel kernels for use in edge detection.

FIG. 10-1 is a diagram of a second original source video frame.

FIG. 10-2 is a diagram of detected edges of the video frame of FIG. 10-1 according to an embodiment of the invention.

FIG. 10-3 is a diagram of detected edge comparisons of the video frame of FIG. 10-2 with a prior video frame according to an embodiment of the invention.

FIG. 11-1 is the diagram of a second original source video frame of FIG. 10-1

FIG. 11-2 is a diagram of calculated energy of the edge of the video frame of FIG. 10-2 according to an embodiment of the invention.

FIG. 12-1 is a process list of selected columns according to an embodiment of the invention.

FIG. 12-2 is a diagram of adjusting column energy based on a prior process list according to an embodiment of the invention.

FIG. 13-1 is a diagram of a third original source video frame.

FIG. 13-2 is a diagram of a stretched version of the original source video frame using linear interpolation.

FIG. 13-3 is a diagram of a stretched version of the original source video frame according to an embodiment of the invention.

FIG. 13-4 is a diagram of a stretched version of the original source video frame using adjusted column energy based on a prior process list according to an embodiment of the invention.

FIG. 14 is a diagram of adjusting column energy based on a selected column according to an embodiment of the invention.

FIG. 15 is a diagram of creating two new columns using a selected column according to an embodiment of the invention.

FIG. 16-1 is a diagram of a fourth original source video frame.

FIG. 16-2 is a diagram of a stretched version of the original source video frame of FIG. 16-1 using linear interpolation.

FIG. 16-3 is a diagram of a stretched version of the original source video frame of FIG. 16-1 using adjusted column energy values according to an embodiment of the invention.

DETAILED DESCRIPTION

Figure 1:
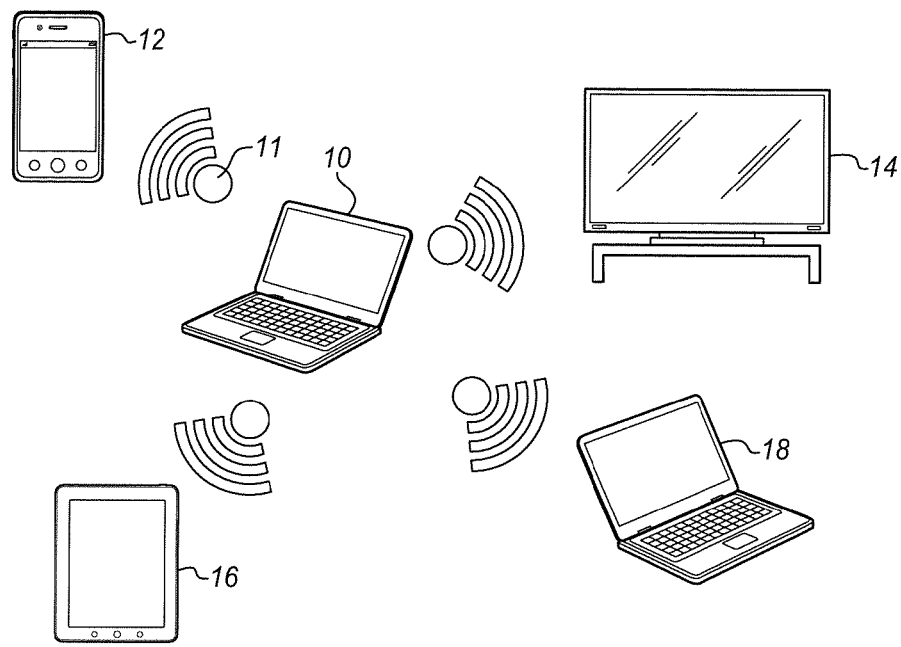
FIG. 1 is a block diagram of usage model for a wireless computing continuum according to an embodiment of the invention.

A computer continuum usage model is widely used for sharing information such as images and videos between different devices. The model applies to local sharing such as for wireless display and to cloud based remote sharing. FIG. 1 shows a local scenario for a computing continuum. A portable computer 10 connects to different devices through a wireless connection 11. Currently common wireless connections include Bluetooth and WiFi. However, there are many other proprietary and standardized display connections including WiDi. As shown, the portable computer may connect to a smart phone 12, a tablet, e-reader, or media player 16, a television set 14 and other computers 18 which may be portable or fixed, desktop, work station, or terminal devices.

The usage model and the video distribution is not limited to the devices shown and may include cameras, media servers, wired or wireless receivers, media players and other devices. Any one or more of these connections may be replaced with a wired connection, such as Ethernet, HDMI (High Definition Multimedia Interface), USB (Universal Serial Bus) or Thunderbolt. The portable computer delivers video to any one or more of the devices each of which may have a different screen resolution and aspect ratio. At present, smart phone and portable handheld media players come with many different screen resolutions and aspect ratios. Tablet computers, similarly, come with many different resolutions and aspect ratios. Televisions seem to have converged on a 16:9 aspect ratio but are offered at 720p, 1080p and 4K with 8K televisions being considered. Computers seem to have converged on three different aspect ratios at present, but there are many different resolutions within those three aspect ratios from 1024×768 to 2560×1440. However, higher pixel density monitors at 2880× 1800 are being introduced that may change how computer screens are configured in the future. While the portable computer is shown as sending video to the other devices, any one of the other devices may deliver video to any one or more of the other devices.

Figure 2:
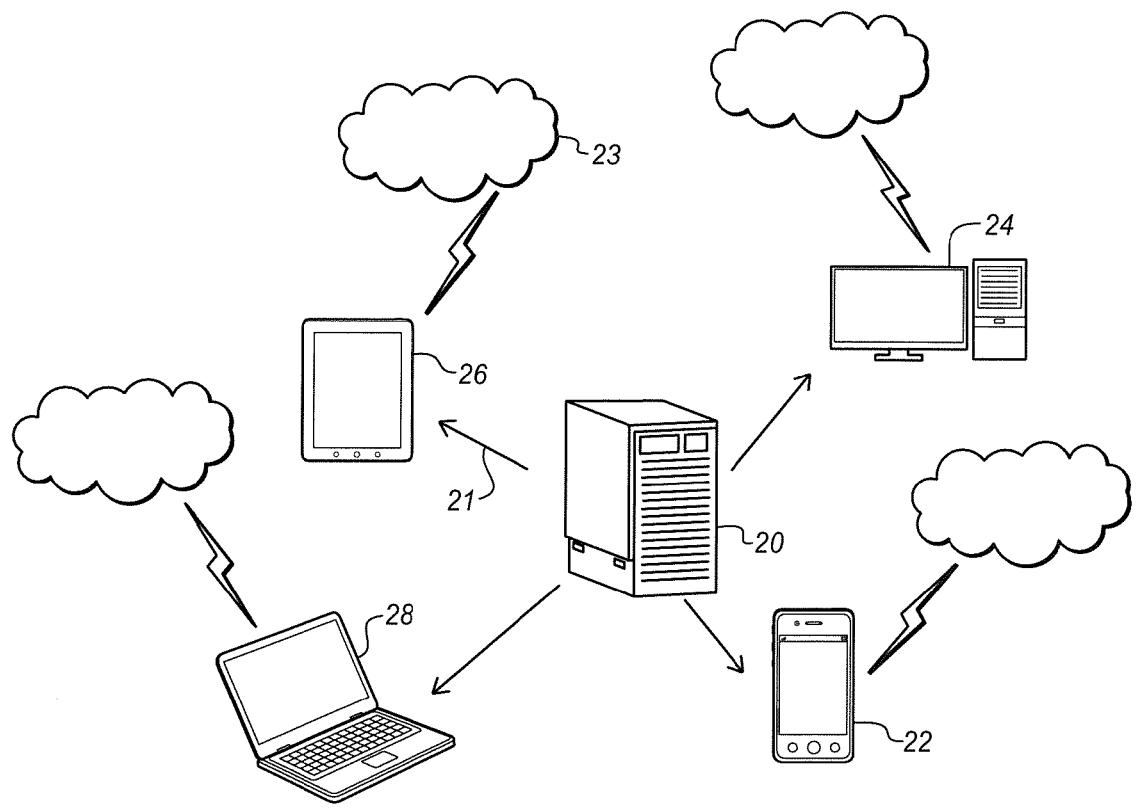
FIG. 2 is a block diagram of a cloud based usage model for a computing continuum according to an embodiment of the invention.

FIG. 2 shows a similar scenario in which the connection between devices is through the cloud. A server 20 sends video to a smart phone 22, a tablet, e-reader, or media player 26, a desktop computer 24 and a portable computer 28. As in FIG. 1, more or fewer devices may be used and more or different types of devices may be used including a television set and an Internet media receiver or streamer. However, in this cloud connection usage model, while the arrows 21 represent the distribution of the video, the data is not sent directly but through the cloud 23. The server 20 represents a remote server, such a web site that hosts content, a server within a corporate intranet, or any other type of remote server to which a device can connect to obtain content.

Currently, there is little consideration of resizing in the computer continuum usage model. While resizing may provide a better user experience, in most cases, the source picture and frame are transferred to a remote device without considering the resolution and screen aspect ratio of the target device. The target device may resize the video or simply display the video within a pillar box or a letter box to compensate for the difference.

When a sending device does accommodate a screen aspect ratio difference in a target device, linear interpolation is typically used to perform real-time image or video resizing. Linear interpolation is common because it is easy to implement. In other implementations a seam curve methodology is used, however, this requires significant processing resources and creates other artifacts. If the ratio of the width to the height of the display on a target devices is different from the original aspect ratio of the content (e.g. from 4:3 to 16:9), the content in each video frame is stretched so that the user can use a full screen mode to play the content. Similarly, for widescreen video on a standard width device, the width of the video may be contracted by linear interpolation. However, by stretching all of the content in each frame using linear interpolation algorithms, the content will be distorted. This can cause a bad user experience for end users.

Figures 1, 3:
Figures 2, 3:
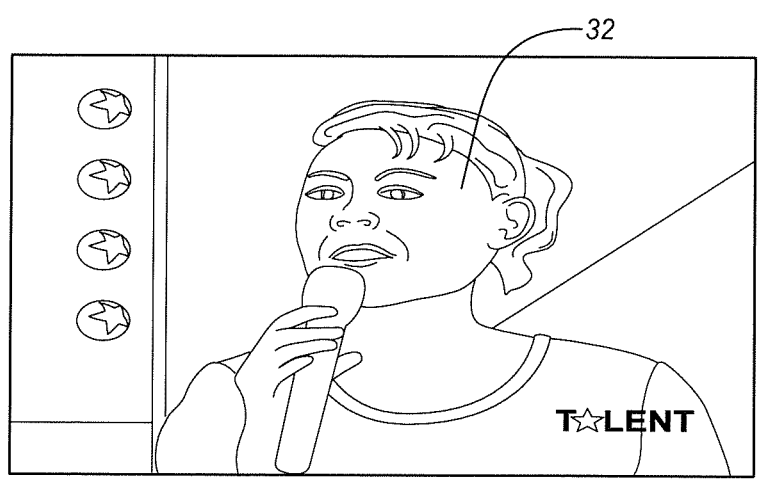

An example of the distortion of linear interpolation is illustrated in FIGS. 3-1 and 3-2. In FIG. 3-1, the original source video has a 4:3 aspect ratio. In FIG. 3-2, the video has been stretched using linear interpolation to a 16:9 aspect ratio. In this example, the most important content of this video frame is the singer 31. The end user can easily detect the image distortion caused by simply stretching the video with linear interpolation. As a result in the resized frame, the singer's face 32 is obviously wider than it should be. This negatively impacts the user experience. Similarly, if the video were compressed for a narrower display, then the singer's face would be too narrow.

In embodiments of the present invention, the stretched image is much better because the aspect ratio of the most important content in the image is maintained close to the natural aspect ratio. This reduces distortion in the important parts of the image and provides a better user experience.

Figures 1, 4:
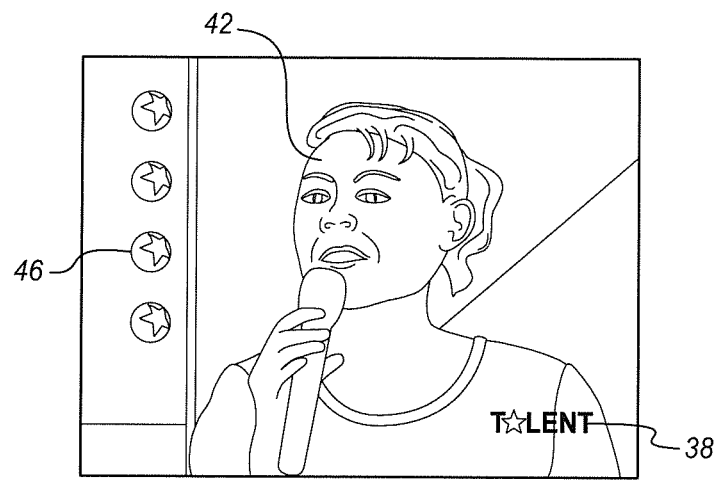
Figures 2, 4:
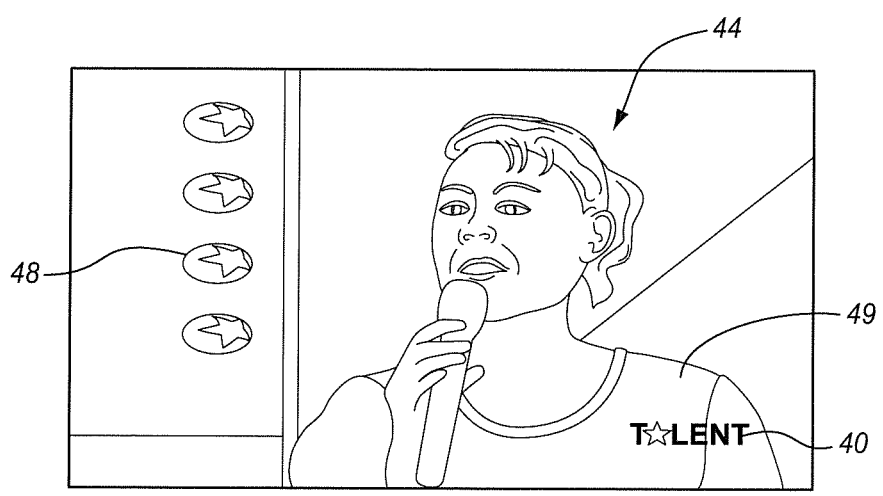

FIG. 4-1 shows the original video as in FIG. 3-1, while FIG. 4-2 shows a stretched version of the video that is stretched using a much better approach. As can be seen, the singer's head 44 is no wider in the stretched video than in the original video 42, but the background image is stretched. For example the circled stars 46 on the left in the original video are no longer round 48 in the stretched video and the text "Talent" 38 on the right is also wider 40 in the stretched video. While the singer's right shoulder 49 is stretched in FIG. 4-2, this is not typically distracting as long as the singer's head and face appear normal.

In embodiments of the invention, video content can be resized in real time. The resizing can be implemented in the computing continuum and the cloud continuum and in other usage models. As a result, the user experience is improved when sharing content, creating a new usage model for the computer continuum.

As shown in FIG. 1, the current computer continuum usage model sends 11 original untouched source frames directly to receivers 12, 14, 16, 18 without accommodation of the resolution and screen ratio of the target devices. This can result in distortion, letter boxing, pillar boxing and other negative effects at the target device.

Figure 5:
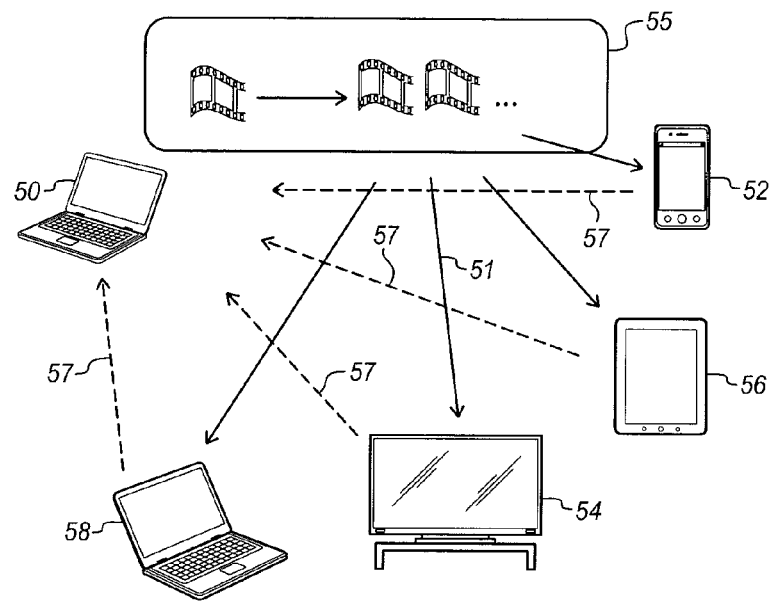
FIG. 5 is block diagram of usage model for a wireless computing continuum with video distribution from a portable computer to other devices according to an embodiment of the invention.

The enhanced usage model of FIG. 5 allows content senders to first receive 57 screen resolution, screen aspect ratio information and other related information from receiving devices. Second, the sender adapts 55 the video accordingly, for example, by a real-time content aware resizing according to the configurations of the target devices. Third, the resized frames are sent 51 to the target devices with more appropriate video frames to reduce distortion and improve the viewing experience.

FIG. 5 shows a video sender 50 with a wired or wireless connection to one or more receivers such as a smart phone 52, a tablet 56, a television 54, and a computer 58. The receivers are able to send configuration information 57 to the sender and the sender can then resize 55 the video before sending it 51 to each device. Each device may receive a different video stream, depending on its configuration. As in the example of FIG. 1, there may be one or many receivers and the types of receivers shown are provided for illustration purposes only.

Figure 6:
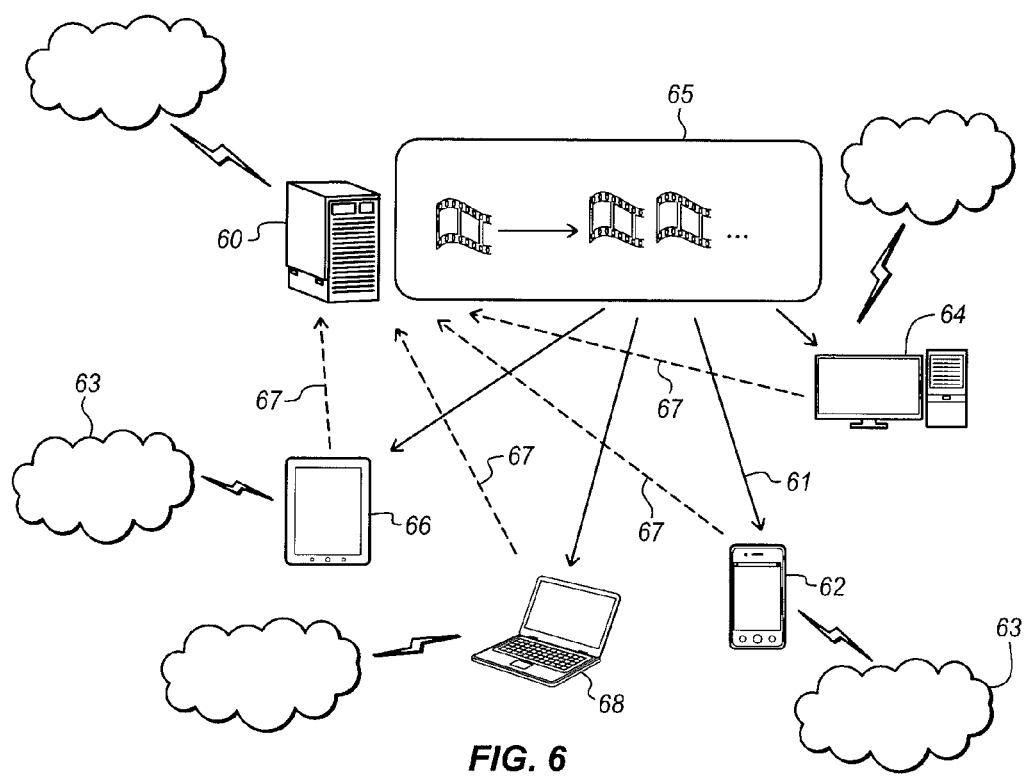
FIG. 6 is a block diagram of a cloud based usage model for a computing continuum with video distribution from a server to other devices according to an embodiment of the invention.

Similarly in FIG. 6, a server 60 is coupled to devices through the cloud 63. Devices such as a smart phone or portable media player 62, a computer 64, a tablet 66 and a portable computer 68 send a request for video 67 that includes display information, such as resolution and aspect ratio. The server resizes 65 the video frames for each device and sends 61 the video to each device for display on its screen through the cloud.

In FIGS. 5 and 6, the resolution and aspect ratio information is shown as being received from the device that requests the video based on the display with which the device is configured or connected as shown. Alternatively, this information may be stored in another location for retrieval by the sender or it may be stored at the sender. In one example, a particular user ID may be associated with a particular device so that the sender uses the user ID to determine the characteristics of the display. In another example, an account number or type may be associated with a particular device. Similarly, instead of the receiving device sending specifications for its display, it may identify itself by model No. or model group or line. The sending device may then apply the identification information to a table to determine the preferred video resolution and aspect ratio. The resolution and aspect ratio may be sent as a ratio of pixels, as specific data, or encoded within particular types. For example, bit code 01 may represent QVGA, bit code 10 may represent WQVGA, bit code 11 may represent HVGA, etc.

Figure 7:
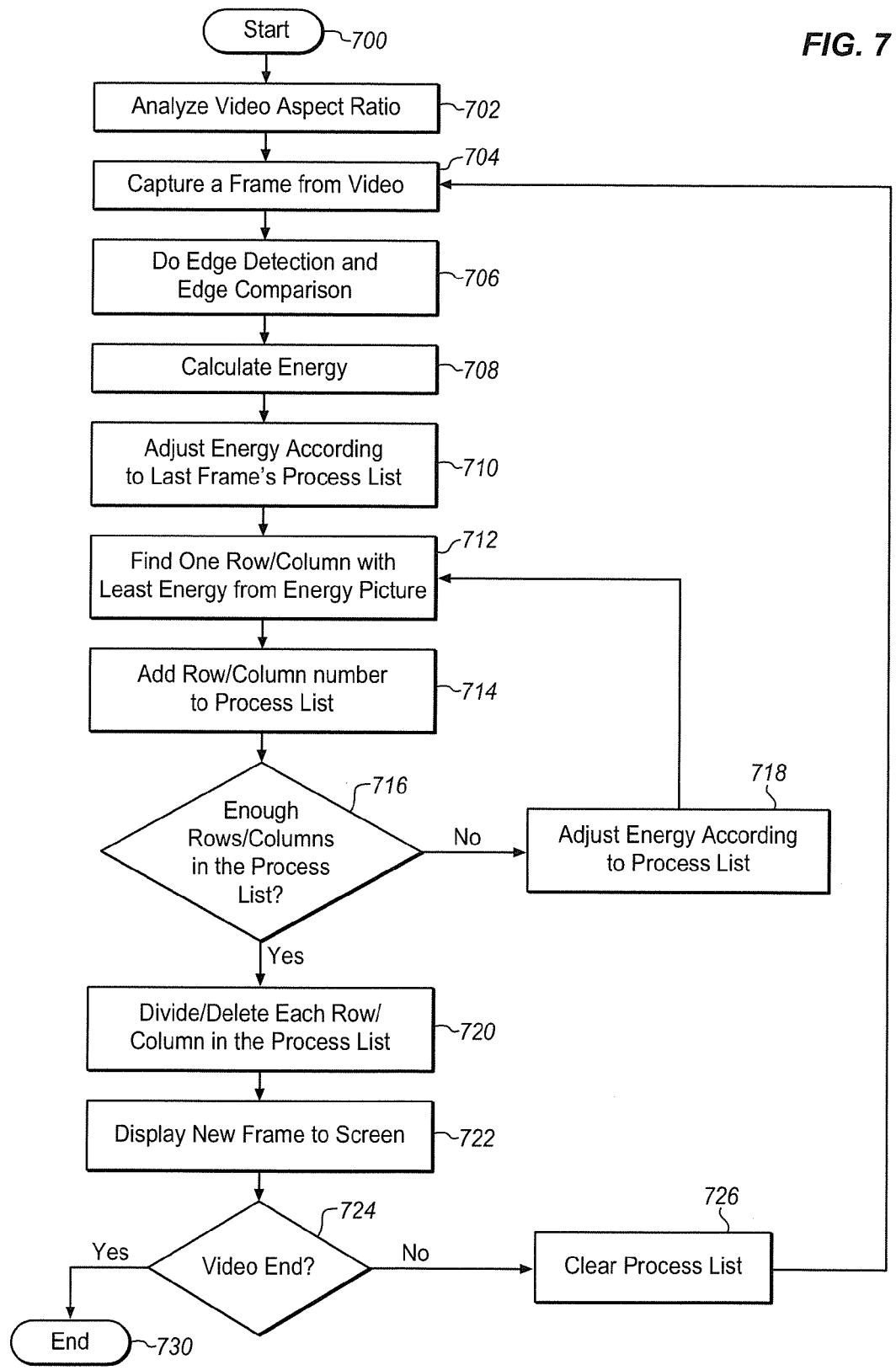
FIG. 7 is a process flow diagram of content aware video resizing according to an embodiment of the invention.
Figure 8:
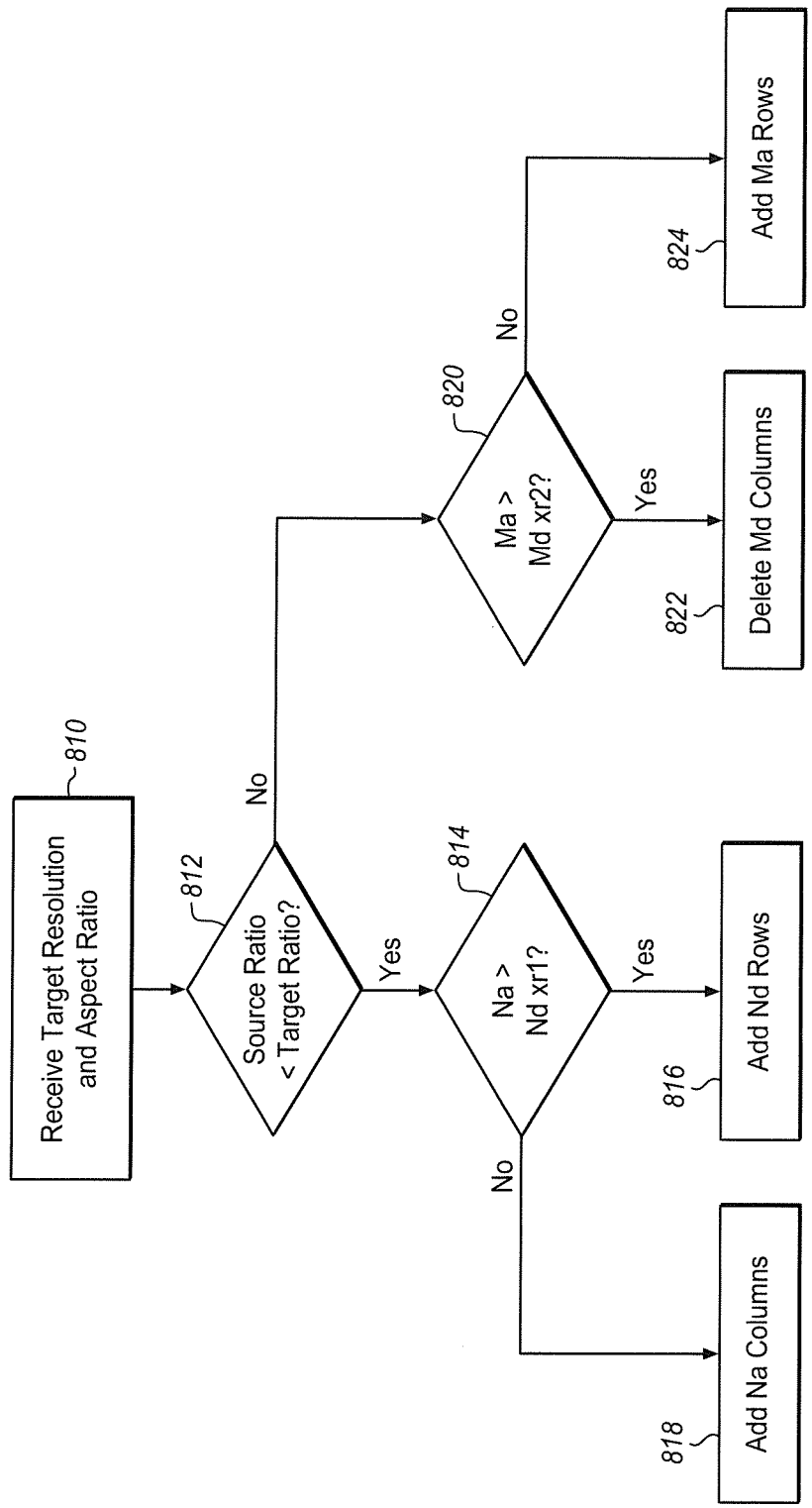
FIG. 8 is a block diagram of determining a video aspect ratio adjustment according to an embodiment of the invention.

While the techniques above are described in the context of resizing a source video and then sending it to a receiving device, similar techniques may be applied to first receiving a source video and then resizing it at a display device or a receiver coupled to a display device. In this case, instead of sending the resolution or aspect ratio information to the video source, it is received from the video source. The operations of FIGS. 7 and 8 are then performed at the receiving device instead of at the sending device. The sending device may be configured to determine the resolution and aspect ratio of the received video from the received video without a separate communication from the sending device containing this information. The same processes described in FIGS. 7 and 8 may then be performed at the receiving device. As a further alternative, an intermediate device between the video source and the display device may be used to resize the video. The communication of resolution and aspect ratio may be made directly with the intermediate device or it may be made as shown in FIGS. 5 and 6 and then the sending device may send the compiled information to the intermediate device.

The resizing described herein reduces the distortion caused by linear interpolation, when the aspect ratio (width/height) of a video is different between the source video and the target device. As described below less change is made to important content when changing the aspect ratio between different devices. FIG. 7 is a process flow diagram for resizing video according to an embodiment of the invention.

Upon receipt of a request for video from another device, the process starts 700 and then analyzes the aspect ratio of the source video and the target screen at 702. This is described in more detail in FIG. 8. Based on this analysis, the sender will add or delete columns or add or delete rows or both from the original video to conform to the aspect ratio of the target screen. Rows and column may both be referred to herein as lines. In the described example, 254 columns will be added to convert a 4:3 video at 640:480 pixels for display on a 16:9 screen at 854:480. The same techniques can be applied to adding rows and to deleting rows and columns. If the target device resolution is 1920:1080 instead of 854:480, then the source video can also be upscaled before it is sent. Alternatively, the target device may upscale the video.

At 704, after determining how to adjust the video, a frame from the video is captured. Edge detection is applied to the captured frame at 704 and then the captured edges are compared to edge detections of the previous frame. If this is the first frame, then no edge comparison is available from a previous frame. The edge comparison may be skipped or the next frame can be captured, the edges detected and the edge comparisons made. In this case, the edge comparison results will be the same for the first two frames.

Any of a variety of different edge detection techniques may be used. A Sobel kernel edge detection uses few processing resources and can be performed quickly. The Sobel kernel also inherently eliminates some noise. Any of a wide variety of different edge detection techniques may be used instead including the Prewitt compass edge detector and the Roberts Cross operator. In some cases, the video compression technique may include edge detection information that can be used instead of or in addition to a Sobel kernel.

FIG. 9 shows an example of a pair of 3×3 Sobel convolution kernels 91, 92 that may be applied to a video frame. The second kernel 92 is the same as the first kernel 91 but rotated 90° counter-clockwise. The kernels are each applied to pixels of the input image to determine gradient components in perpendicular directions. The gradient components are combined to find an absolute magnitude of a gradient which corresponds to an edge.

Using a detected edge from two related frames, the edges can be compared for example as |E1-E2|, where E1 is the current frame's edge detection result and E2 is the last frame's edge detection result. The edge comparison effectively tracks movements or changes in the video between frames. These areas of high movement tend to be the areas which users focus on. Accordingly, these are the important areas of the video in which distortion is the most objectionable.

FIG. 10-1 shows an example 4:3 video frame with a singer 94 holding a microphone in front of a background. FIG. 10-2 shows an edge detection result for the same video frame. FIG. 10-3 shows an edge comparison result between the edge detection of FIG. 10-2 and a previous video frame of the same scene. The drawing figures are presented as approximations of the results and like all of the diagrams of video frames and video calculations herein are not complete nor fully detailed. They drawing figures are presented in order to aid understanding and are greatly simplified compared to an actual video frame and actual results. Details are removed in order to scale down the drawings and allow them to be readable and reproducible.

FIG. 10-2 shows that the detected edges correspond to the visible details of the line drawing representation of the video image in FIG. 10-1. For an actual video frame corresponding to FIG. 10-1, there will be color variations, shading, brightness contrasts and other details that are not shown in the drawing figure in order to simply the figure. FIG. 10-3 shows the edge comparison result plotted at each pixel of the video frame. The pixels show the result of an edge comparison for each detected edge of FIG. 10-2 with each detected edge of a similar previous frame (not shown). The features of 10-3 indicate that the singer 94 of FIG. 10-1 has moved from one frame to the next, while the background 95 and identifications 96 have not.

While the edge comparison is effective for a sequence of frames of a continuous scene, the edge comparison is not effective when there is a change of scene. In a change of scene or a change of camera view, edges will move drastically to a different part of the frame. However, in the second frame of the same scene or same camera view, the edges will again line up. Accordingly, the edge comparison fails only for the first frame of each scene. Given typical video frame rates of 24, 30, 60 frames per second or more, a single frame of distortion when changing scenes will not be easily noticed. The process can default to a simple linear interpolation if there are no detected edges or if the detected edges are very far apart.

The result of the edge comparison can be used at 708 to calculate an energy for each pixel. FIG. 11-1 shows the same video frame as in FIG. 10-1 and FIG. 11-2 shows the energy associated with each column of the video frame. FIG. 11-2 is a diagram of a graph in the form of a histogram showing the energy magnitude on the vertical axis for each column across the horizontal axis. The horizontal axis of the histogram is on the same scale as the video frame of FIG. 11-1. This shows that the highest energy is around the singer 94. The background 95 and titles 96 have very low energy. This is again to be expected because in the simple scene of the illustrated video frame the singer moves much more than the background.

The edge comparison result may be used to calculate the energy of each column. In a simple example, the absolute value of the edge comparison may be used so that for each pixel, $E_{i,j}=|E1_{i,j}-E2_{i,j}|$, where i and j indicate the row and column of the respective pixel. To calculate the energy of the row, the $E_{i,j}$ values for each pixel in a column can simply be added. This can be expressed mathematically as a sum of all pixels in column j from i=0 to "height" as follows:

$$f(j)=\Sigma_{i=0}^{height} f(i,j) \qquad \text{Eq. 1}$$

where f(j) is the energy of column j, f(i,j) is the pixel value of row i, column j (indicated as $E_{i,j}$ above), and height is the maximum or top row in the video frame.

The energy value determined in Equation 1 may be used directly in the operation at 712 of selecting columns to stretch or expand. Alternatively at 710 the calculated energy values may optionally be adjusted based on prior energy value determinations. The adjustment at 712 reduces possible video uttering that might be caused by frequently changing the columns that are selected. In order to prevent video jitter, the energy adjustment operation reduces the chance that different columns are selected in each frame. It adds a kind of memory or momentum that resists change. As a result, the selected columns in one frame tend to be selected for the next frame.

As an example, if in Frame 1 column S is selected and stretched during resizing, then in Frame 2 column S will probably also be selected. Otherwise, there is a high possibility for users to see some video jitter. In order to increase the chances of selecting the same column, the energy determined for a column at block 708 is adjusted using the process list for the last frame.

Figures 1, 12:
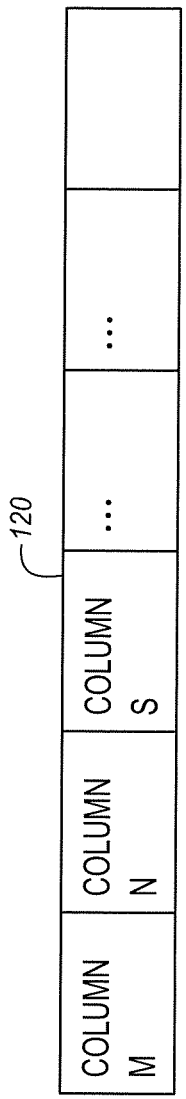
Figures 2, 12:
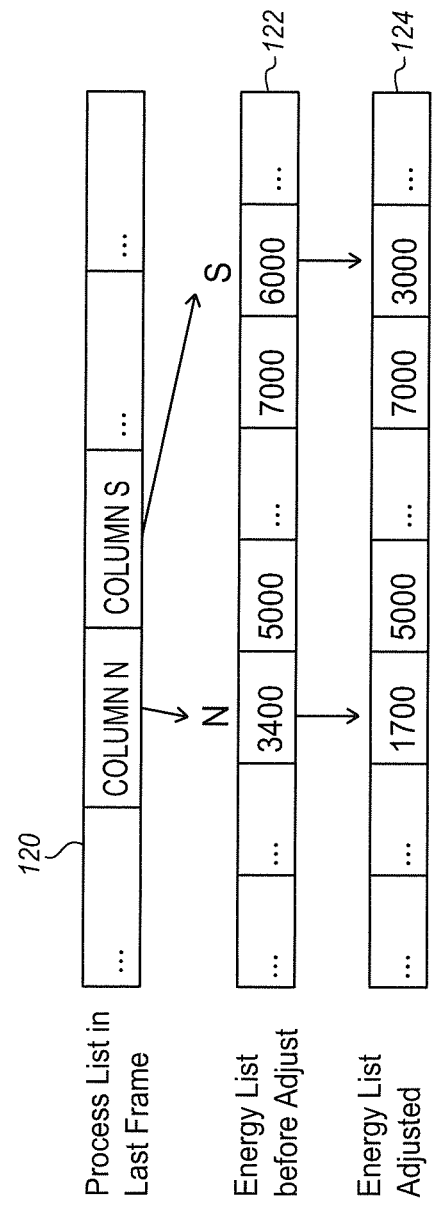

The process list is a list of the columns which were selected for stretching. As shown in FIG. 12-1, a process list 120 may simply be a list of the previously selected columns. FIG. 12-1 is a diagram of a portion of a process list showing that columns M, N, and S were selected and that at least columns O, P, Q and R were not selected to be stretched in the previous frame. This may be stored as a row in a table identified with a frame number from the video sequence.

FIG. 12-2 is a diagram to show how the previous frame's process list may be used to adjust the energy for columns of the current frame. The process list 120 is used to identify columns in an energy list 122. The energy list is a list of the computed energy values for each column in block 708. As shown the process list is applied to the energy list and for each column that appears in the energy list, the energy is adjusted downwards. As an example for Column N the energy value of 3400 is adjusted downward to 1700. For Column S, the energy value is adjusted downward from 6000 to 3000. An adjustment factor of 0.5 is applied to each value. The other columns are unaffected because they do not appear on the process list for the previous frame.

The operation can be expressed mathematically as follows:

$$E_n(i)=\text{rate}\times E_0(i)$$

if column i is in the previous process list $$\text{else } E_0(i) \qquad \text{Eq. 2}$$

where $E_n(i)$ is the new energy of column i for the current frame after it has been adjusted, $E_0(i)$ is the original energy of column i for the current frame before it is adjusted and rate is a value used to adjust the energy to a lower value. The value of rate can be determined empirically and varied for different types of programming. Rate may be in a range, for example, in many types of video programs of between 0.3 and 0.7. The lower the value the less readily the system will select a different column.

With the adjusted energy values at 710, the resizing sender can find one column that has the lowest energy value at 712. This column may be the one with the least amount of edge movement, subject to the adjustment using the previous frame process list. Any of a variety of different techniques can be used to find the lowest value. In one example, heap sort is used to get the smallest value of the energy map. After making the selection, the selected column is added to the process list.

The selection process at 712 will repeat as long as at 716 more columns or rows are needed to reach the intended number of columns. In the present example, 254 columns are to be added to the frame to resize it from 640 columns to 854. In order to add 254 columns, 254 columns of the frame are selected and these are doubled to form an additional 254 columns. There will be 386 columns that are not selected.

As a further optional operation at 718, after each column is selected at 712 and added to the list, before another column is selected at 712 a further energy adjustment is made at 718. In brief, the energy map is adjusted based on the selected column to reduce the likelihood that the same column is added to the process list twice and to reduce the likelihood that the columns next to the selected column are chosen. Since each stretch destroys frame content, it is better to avoid stretching adjacent or neighboring continuous columns. This can be seen in FIGS. 13-1, 13-2, 13-3 and 13-4.

Figures 2, 13:
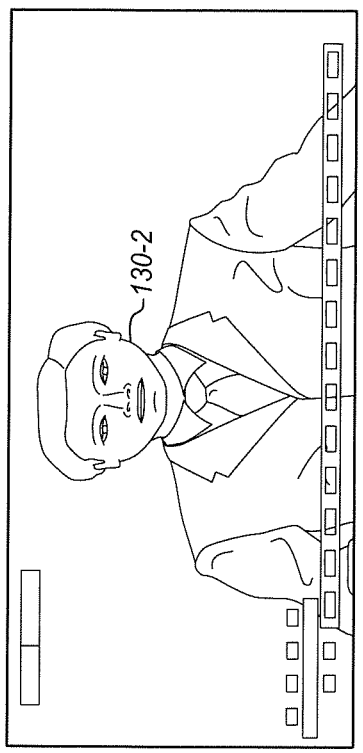
Figures 4, 13:
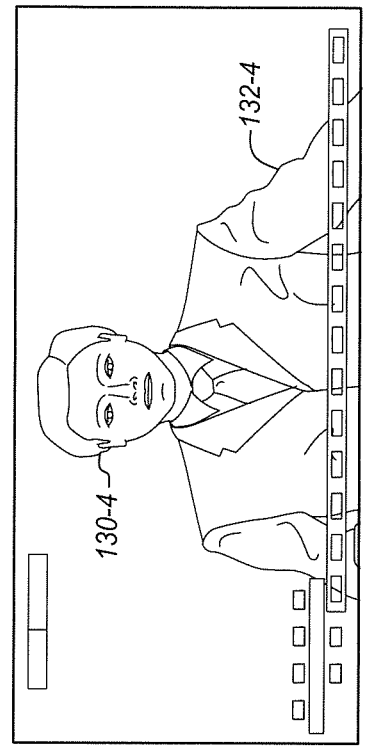
Figures 1, 13:
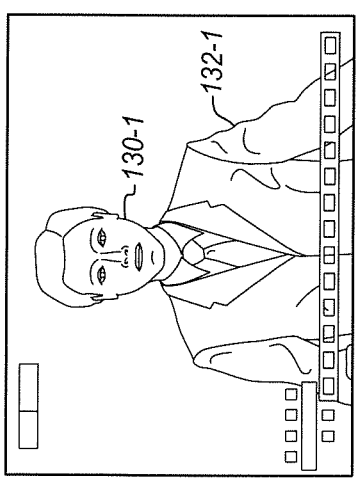
Figures 3, 13:
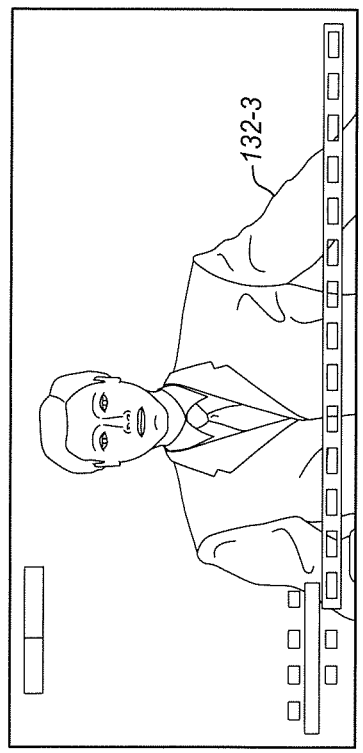

FIG. 13-1 represents an original, unmodified 4:3 frame of a video sequence. FIG. 13-2 shows the same frame with simple linear interpolation. As in the prior examples, the speaker's head 130-1 is obviously too wide 130-2 with linear interpolation and the appearance is unpleasant and unnatural. In FIG. 13-3 the frame of FIG. 13-1 is stretched without any adjustment to the energy as in block 718 but with the energy adjustment based on the previous frame's process list as at block 710. In FIG. 13-3, the speaker's head 130-3 looks natural, however, because the left arm 132-1 was not moving it was stretched 132-3 across continuous columns. The speaker's left shoulder and arm are much wider than in the source frame of FIG. 13-1. This also is unpleasant for viewers. In FIG. 13-4, the energy list has been adjusted. The energy values of columns next to each selected column are adjusted. This means that some of the adjustment is applied to the speaker's head 130-4 and right arm and shoulder 132-4. While the speaker's head is wider than in the original frame, the effect is less than for linear interpolation and looks more natural while still filling the wider aspect ratio.

The energy adjustment at 718 considers the selected column and then scales the energy of the column on either side of the selected column. This reduces the chance that the adjacent columns will also be selected. However, if the energy of the other columns is still high, the adjacent columns may still be selected. The likelihood of their selection can be adjusted by a scaling factor.

The energy adjustment is diagrammed in FIG. 14. The top row 142 of values represents an energy value list for the current frame. In this example, Column i has been selected for the process list with an energy value of f(i), the lowest energy value of the remaining columns at block 712. Accordingly, the energy of the column on the left column i−1 and column i+1 on the right of the selected column is raised to a higher value. This reduces their chance of also being selected for stretching. The higher value can be determined simply by multiplying the existing value f(i−1), f(i+1) by a scaling factor or ratio. A factor in the range of 1.5 to 2.0 has been found to be suitable as a rate. The larger the scaling factor, the more the column selection will be distributed throughout the frame. The higher values are shown in the modified energy table 144.

The energy adjustment may be expressed mathematically as follows:

$$f(i-1)=f(i-1)+\text{rate}\times f(i)$$

$$f(i+1)=f(i+1)+\text{rate}\times f(i) \quad \text{Eq. 4}$$

where i is the column to be stretched, f(i) is the energy of the column, f(i−1 and f(i+1) are the energies of the columns that neighbor column i and rate is the weighting factor for increasing the energy of adjacent columns.

After enough columns have been selected at 716, then at 720, the selected columns are divided into two or more columns for the present example, or if instead the resized frame is to be smaller, then the columns may be deleted. This is described in more detail below. In one example, a column is converted into two columns. The pixel values for each pixel of the column are averaged between the selected column and the column on either side. More sophisticated averaging, interpolation, or pixel estimation techniques may be used, if desired.

One example of the stretching process may be further described as follows. First a selected column is chosen from the process list of the current frame. The column is used to create two columns. If the selected column is column M, then the two new columns that take its place can be referred to as M' and M".

If M' is to the left of M", then the pixel values for M' may be taken as the pixel values for the original M column adjusted using the pixel values of Column L or, as illustrated in FIG. 15, M−1 immediately to the right of Column M. A simple way to adjust the pixel value is to use an average of the adjacent pixel values as the adjustment. This can be shown mathematically as follows:

$$f(M',y)=0.5(f(M-1,y)+f(M,y))$$

$$f(M'',y)=0.5(f)M+1,y)+f(M,y)) \quad \text{Eq. 3}$$

where f(M',y) and f(M",y) are pixel values in new picture row y, column M' and column M" are the two new columns derived from column M, column M−1 is the column to the left of column M, e.g. column L, and column M+1 is the column to the right of column M, e.g. column N. While Equation 3 shows an average, the average may be weighted so that the original values are more important. For example f(M'y)=0.4f(M−1,y)+0.6Ff(M,y), uses a 60/40 weighting emphasizing the original value over the neighboring value. As a further alternative, other techniques may be used to determine pixel values based on additional nearby pixels in the same or in prior and later frames. The particular approach to determining the pixel value in the newly created columns may be adapted to suit different implementations of complexity and video types.

As shown in FIG. 15, the process list 120 is applied to the current video frame in order to stretch the picture by creating two columns of pixels in the place of one column, in this case Column M. As seen in the table 126 of pixel values for the current frame, column M has values 20, 10, and 130 in a particular part of the column. The column to the left, M−1 has values of 100, 50, 130 and the column to the right, M+1, has values of 200, and 70. In the stretched video frame pixel table 128, column M is replaced by two columns labeled M', M". The pixel values are the averages of the column M values with the values on either side. So, for example, for M' the average of 20 and 100 is 60. 60 replaces 100 as the pixel value for the top pixel shown into the diagram of FIG. 15. Similarly, for Column M", the average of 20 and 200 is 110. 110 becomes the pixel value of the top pixel in column M" for the stretched image 128 of FIG. 15.

It may be noted, considering the top line of pixel values for the three columns of the original source frame 126, there is a big change in column M from the adjacent columns. The original row sequence in table 126 is 100, 20, 200. In the stretched video frame 128, the sequence is 100, 60, 110, 200. As a result the information of column M of pixel value 20 is diluted by the neighboring pixel values. This creates a smooth transition for the additional columns but information about the change in value is lost. In other words, this edge in the image will become softened. Since this information is not about a moving edge, the loss of the information will be less noticeable to the viewer. The energy adjustment performed after each column selection at 718 reduces the loss of data caused by the averaging of pixel values by reducing the number of adjacent rows that will be averaged for stretching. As an alternative to the process diagrammed in FIG. 14 and shown in Equation 3, the selected column may simply be replicated. Instead of two columns with averaged values, there are then two columns with same pixel values as the original selected column, 20, 10, 130.

In the present disclosure pixel values are referred to as having a single numerical value such as 100, 20, or 200. Pixel values are referred to in this way in order to simplify the description. The pixel values referred to herein are for brightness at a particular position in an image defined by row and column. While some types of video sequences may have a single value for each pixel, typically, there will be multiple values corresponding to RGB, YUV, or some other type of color system. The pixel values may be combined with neighboring pixels in space or time to support some type of video compression including interlacing. Accordingly, a value for a particular pixel as used herein, may refer to a single component at a particular row or column, or it may refer to a value with 2, 3, or 4 color components, depending on the nature of the source video.

After all of the selected columns in the process list 120 have been stretched at 720, the process of FIG. 7 sends the resized video frame to the receiving display device 58, 68 at 722. If this is not the end of the video at 724, then the process list is cleared and stored for use in the next video frame at 726 and a new video frame is captured for processing at 704. If it is the last frame of the video, then the process ends at 730.

Referring to FIG. 8, there are at least two ways to make a source video match a target aspect ratio. For example, if the original video has a ratio of width to height less than the target ratio, then the original video can be resized either by adding more columns or by deleting rows. The figure shows how to determine whether lines are to be added or deleted and whether those lines are rows or columns For example, consider a video of (640:480) (aspect ratio 4:3) that is to be resized to an aspect ratio of 16:9. It can be changed to a size of (854:480) with 254 columns added or be changed to a size of (640:360) with 120 rows deleted. On the other hand, to convert a video with an aspect ratio of 16:9 to 4:3, either rows can be added or columns can be deleted. By first analyzing which way to resize, the most important information can be protected from loss.

FIG. 8 shows a process at 702 for determining how to resize the video before sending to a receiving device. At 810, the sender receives the target resolution and aspect ratio. At 812, the resolution and aspect ratio of the source video is compared to that for the target device. If it is smaller, then the number of columns and rows to be added to resize the source or original video for the target device is determined.

At 814, the number of columns, Na, that would need to be added for the target device is compared to the number of rows, Nd, that would need to be added. The number of rows is weighted by a factor, r1, in a direct comparison, however, alternatively, the number of columns may be weighted instead of or in addition to weighting the number of rows. The weight factor biases the comparison in favor of adding columns instead of deleting rows. The factor is based on empirical studies of human perception of what is considered more pleasing. If at 814, the number of columns is less than the weighted number of rows, then at 818 it is determined that columns will be added. If the number of columns to be added is greater than the number of rows to be deleted at 814, then it will be determined that rows should be deleted. The comparison is to determine how to make the smallest change to the original video by making the smallest change. The weighting factor will bias the decision in favor of adding instead of deleting if the two numbers are close.

Similarly, if the original video is larger than the target video at 812, then the number of rows, Ma, that would have to be deleted is compared at 820 to the number of columns, Md, that would have to be added. As at 814, the number of rows is weighted by a factor, r2, to compensate for human perception. If the weighted number of rows is greater, then at 822 it is determined to delete columns at 822. Similarly if the number of columns is greater, then it is determined to add rows at 824.

The weighting factors can be determined in a variety of different ways and can reflect a comparison of the distortion Dr1 of deleting a row versus the distortion Dc1 of adding a column. The distortion values can be determined by observation and measurement. The weighting factor r1 may then be expressed as a ratio Dr1/Dr2. The factor can be scaled to achieve the desired results. Similarly the weighting factor r2 for adding rows and deleting columns can be determined as a ratio Dr2/Dc2 of the distortion of adding a row compared to deleting a column.

The operations of FIG. 8 may be performed each time a video request is received or each time a source video is received in a different format. Alternatively, the results of a process like that shown in FIG. 8 may be stored in a lookup table. The most common video formats and display device formats may be stored in a lookup table, so that each time the sender is presented with these common formats, the number of columns or rows to be added or deleted may be determined quickly. For example, the conversion from 4:3 VGA resolution to 16:9 WVGA resolution represents common aspect ratios and the result of adding 254 rows can be stored in the lookup table. This allows the sender to act more quickly. The sender may use the lookup table exclusively and present best matches or it may use the lookup table for common scenarios and then apply a process such as that of FIG. 8 for special cases.

As described, the computing continuum usage model is enhanced by resizing to the target device configuration before content is shared. The techniques described above allow for real-time content aware video resizing, while reducing the possibility of video uttering as occurs in seam curve based methods, and reducing the artifacts incurred by seam curve based methods.

The described techniques use content analysis for video resizing. This allows more important content to be changed less than background content. This is done with lower time complexity, which allows real-time resizing processing to be implemented on consumer level devices. The content is analyzed also by adjusting energy determinations according to a process list for the last frame. This efficiently reduces video jitter after resizing, which is common in seam curve methods.

In addition, the energy can adjusted based on rows or columns added to a processing list in the current frame. This can effectively eliminate artifacts. Too great a stretch on just one part of an image can easily create artifacts.

Figures 1, 16:
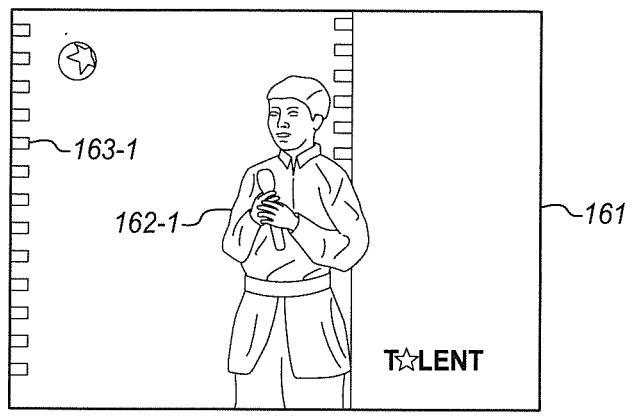
Figures 2, 16:
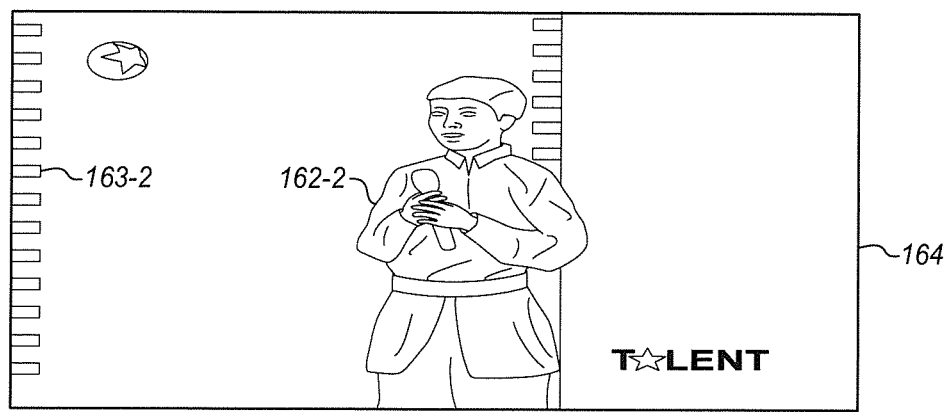
Figures 3, 16:
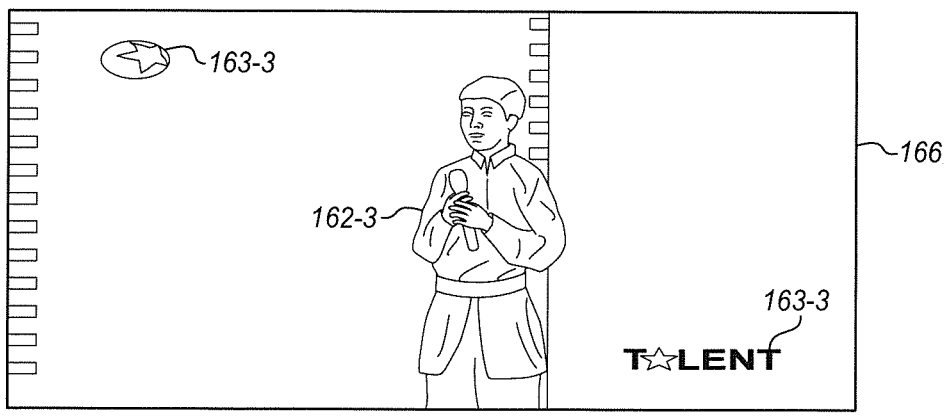

FIG. 16-1 shows another video frame 161 in an original 4:3 format with a speaker 162-1 and a background 163-1. When the video frame is stretched with linear interpolation in FIG. 16-2 to render a wider frame 164, the speaker 162-2 is also stretched together with the background 163-2 which does not look natural. Using the techniques described above as in FIG. 16-3, the speaker 162-3 looks much more natural. The frame is filled by stretching the nonmoving or static background elements 163-3.

Figure 17:
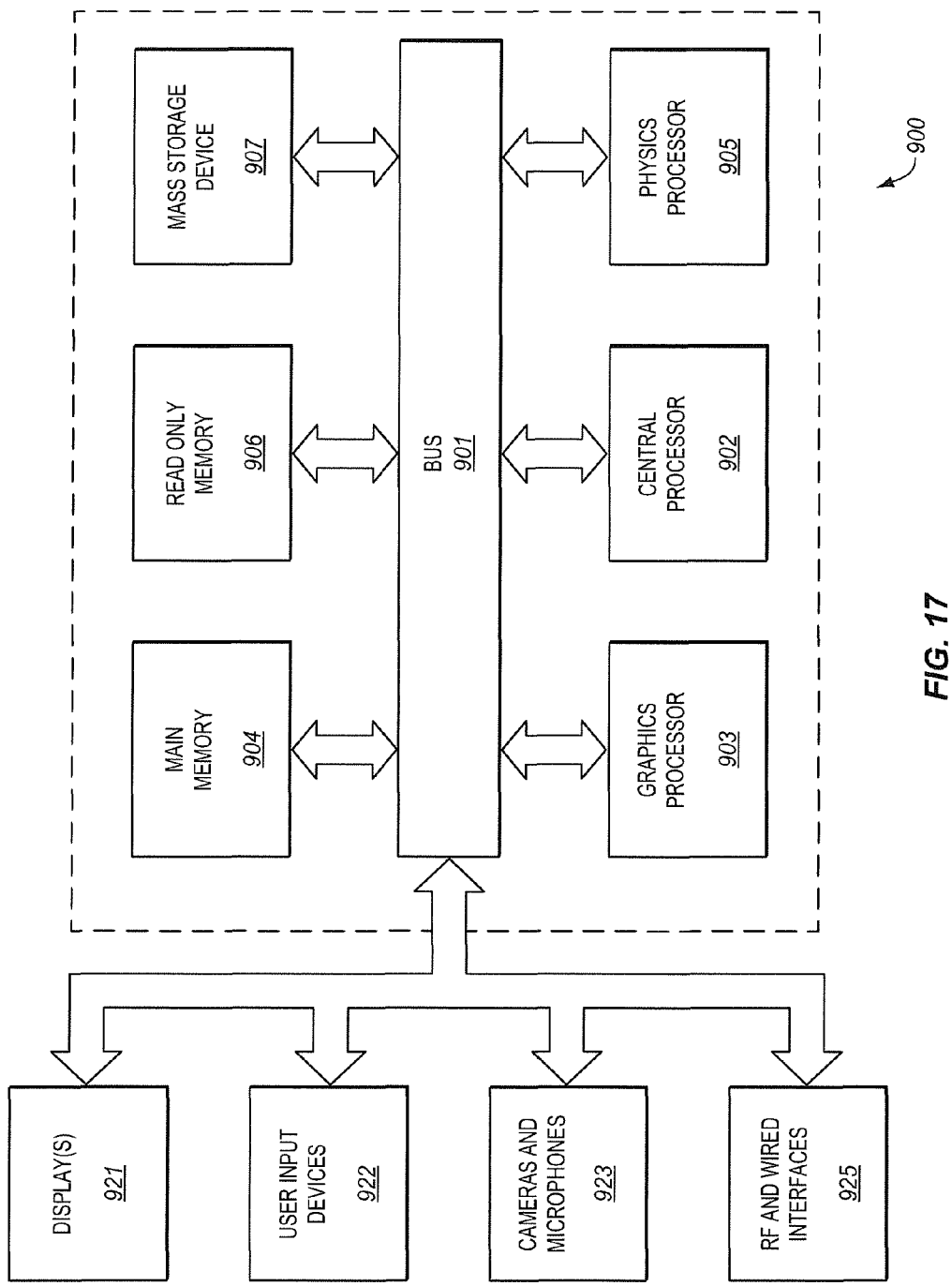
FIG. 17 is a block diagram of a computer system suitable for use with an embodiment of the invention.

FIG. 17 is a block diagram of a computing system, such as a personal computer, gaming console, smart phone or portable gaming device, suitable for acting as sender, receiver, or intermediate device as described above. Computer system 900 may refer to a many examples of an electronic device and may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof.

The computer system 900 includes a bus or other communication means 901 for communicating information, and a processing means such as a microprocessor 902 coupled with the bus 901 for processing information. In the illustrated example, processing devices are shown within the dotted line, while communications interfaces are shown outside the dotted line, however the particular configuration of components may be adapted to suit different applications. The computer system may be augmented with a graphics processor 903 specifically for rendering graphics through parallel pipelines and a physics processor 905 for calculating physics interactions as described above. These processors may be incorporated into the central processor 902 or provided as one or more separate processors. The computer system 900 further includes a main memory 904, such as a random access memory (RAM) or other dynamic data storage device, coupled to the bus 901 for storing information and instructions to be executed by the processor 902. The main memory also may be used for storing temporary variables or other intermediate information during execution of instructions by the processor. The computer system may also include a nonvolatile memory 906, such as a read only memory (ROM) or other static data storage device coupled to the bus for storing static information and instructions for the processor.

A mass memory 907 such as a magnetic disk, optical disc, or solid state array and its corresponding drive may also be coupled to the bus of the computer system for storing information and instructions. The computer system can also be coupled via the bus to a display device or monitor 921, such as a Liquid Crystal Display (LCD) or Organic Light Emitting Diode (OLED) array, for displaying information to a user. For example, graphical and textual indications of installation status, operations status and other information may be presented to the user on the display device, in addition to the various views and user interactions discussed above.

Typically, user input devices 922, such as a keyboard with alphanumeric, function and other keys, may be coupled to the bus for communicating information and command selections to the processor. Additional user input devices may include a cursor control input device such as a mouse, a trackball, a trackpad, or cursor direction keys can be coupled to the bus for communicating direction information and command selections to the processor and to control cursor movement on the display 921.

Camera and microphone arrays 923 are coupled to the bus to observe gestures, record audio and video and to receive visual and audio commands as described above.

Communications interfaces 925 are also coupled to the bus 901. The communication interfaces may include a modem, a network interface card, or other well known interface devices, such as those used for coupling to Ethernet, token ring, or other types of physical wired or wireless attachments for purposes of providing a communication link to support a local or wide area network (LAN or WAN), for example. In this manner, the computer system may also be coupled to a number of peripheral devices, other clients, control surfaces or consoles, or servers via a conventional network infrastructure, including an Intranet or the Internet, for example.

A lesser or more equipped system than the example described above may be preferred for certain implementations. Therefore, the configuration of the exemplary systems 900 will vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following examples pertain to further embodiments. The various features of the different embodiments may be variously combined with some features included and others excluded to suit a variety of different applications. Some embodiments pertain to a method including capturing a first and second frame of a video sequence, the frames having pixel values in rows and columns, detecting edges of pixel values of the first and second frames, comparing the edges of the first frame with the edges of the second frame, determining an energy of lines of pixels of the second frame based on the comparison, the lines corresponding to either rows or columns, selecting lines having the lowest energy, and resizing the second frame using the selected lines having a low determined energy.

Further embodiments include repeating capturing, detecting, comparing, determining, and resizing for each additional frame of the video sequence. Further embodiments include sending the resized frame to a video display device. In further embodiments, resizing comprises deleting lines, or creating additional lines using the selected lines. In further embodiments, creating additional lines comprises creating two lines to replace each selected line, the pixel values for the created two lines being an average of the pixel values of the selected line with the pixel values of an adjacent line of the second frame. In further embodiments, determining an energy comprises determining an absolute value of the difference in energy between edges of the first and second frame for each pixel in a line and adding the determined absolute values for each edge having pixels in a single line.

Further embodiments include adjusting the determined energy by reducing the energy of each line that was selected in the first frame by a weighting factor or selecting lines by selecting a first line having a lowest energy and increasing the determined energy of lines adjacent to the first line by a second weighting factor.

In some embodiments a machine-readable medium has instructions stored thereon that when operated on by the machine cause the machine to perform operations such as capturing a first and second frame of a video sequence, the frames having pixel values in rows and columns, detecting edges of pixel values of the first and second frames, comparing the edges of the first frame with the edges of the second frame, determining an energy of lines of pixels of the second frame based on the comparison, the lines corresponding to either rows or columns, selecting lines having the lowest energy, and resizing the second frame using the selected lines having a low determined energy.

The operations may further include repeating capturing, detecting, comparing, determining, and resizing for each additional frame of the video sequence, or sending the resized frame to a video display device, or adjusting the determined energy by reducing the energy of each line that was selected in the first frame by a weighting factor.

In some embodiments an apparatus includes means for capturing a first and second frame of a video sequence, the frames having pixel values in rows and columns, means for detecting edges of pixel values of the first and second frames, means for comparing the edges of the first frame with the edges of the second frame, means for determining an energy of lines of pixels of the second frame based on the comparison, the lines corresponding to either rows or columns, means for selecting lines having the lowest energy. and means for resizing the second frame using the selected lines having a low determined energy. In further embodiments, the means for resizing resizes by deleting lines or by creating additional lines using the selected lines.

In some embodiments an apparatus includes a mass storage device to store a first and second frame of a video sequence, the frames having pixel values in rows and columns, a processing unit to detect edges of pixel values of the first and second frames. to compare the edges of the first frame with the edges of the second frame, to determine an energy of lines of pixels of the second frame based on the comparison, the lines corresponding to either rows or columns, to select lines having the lowest energy, and to resize the second frame using the selected lines having a low determined energy, and an external interface to receive a request for the resized video and to send the resized frame to a video display device in response to the request.

In further embodiments the processing unit is further to repeat capturing, detecting, comparing, determining, and resizing for each additional frame of the video sequence, or the processing unit is to resize the second frame by creating two lines to replace each selected line, the pixel values for the created two lines being an average of the pixel values of the selected line with the pixel values of an adjacent line of the second frame. In further embodiments, determining an energy comprises determining an absolute value of the difference in energy between edges of the first and second frame for each pixel in a line and adding the determined absolute values for each edge having pixels in a single line.

Further embodiments include adjusting the determined energy by reducing the energy of each line that was selected in the first frame by a weighting factor. In further embodiments, selecting lines comprises selecting a first line having a lowest energy and increasing the determined energy of lines adjacent to the first line by a second weighting factor.

The invention claimed is:

1. A method comprising:
   capturing a first and second frame of a video sequence, the frames having pixel values in rows and columns;
   detecting edges of pixel values of the first and second frames;
   comparing the edges of the first frame with the edges of the second frame;
   determining an energy of lines of pixels of the second frame based on the comparison, the lines corresponding to either rows or columns;
   adjusting the determined energy by reducing the energy of each line that was selected in the first frame by a weighting factor;
   selecting lines having the lowest energy; and
   resizing the second frame using the selected lines having a low determined energy.

2. The method of claim 1, further comprising repeating capturing, detecting, comparing, determining, adjusting, selecting, and resizing for each additional frame of the video sequence.

3. The method of claim 1, further comprising sending the resized frame to a video display device.

4. The method of claim 1, wherein resizing comprises deleting lines.

5. The method of claim 1, wherein resizing comprises creating additional lines using the selected lines.

6. The method of claim 5, wherein creating additional lines comprises creating two lines to replace each selected line, the pixel values for the created two lines being an average of the pixel values of the selected line with the pixel values of an adjacent line of the second frame.

7. The method of claim 5, wherein creating additional lines comprises creating two lines to replace each selected line, the pixel values for the created two lines being the same as the pixel values of the selected line.

8. The method of claim 1, wherein determining an energy comprises determining an absolute value of the difference in energy between edges of the first and second frame for each pixel in a line and adding the determined absolute values for each edge having pixels in a single line.

9. The method of claim 1, wherein selecting lines comprises selecting a first line having a lowest energy and increasing the determined energy of lines adjacent to the first line by a second weighting factor.

10. The method of claim 1, further comprising after selecting lines having the lowest energy, further adjusting the energy based on the each selected line to reduce the likelihood that the same line is added to a resizing process list twice and to reduce the likelihood that lines next to a selected line are selected for use in resizing.

11. The method of claim 1, further comprising after selecting lines having the lowest energy, further adjusting the energy by reducing the energy of lines on either side of a selected line.

12. A non-transitory machine-readable medium comprising instructions stored thereon that when operated on by a machine cause the machine to perform operations comprising:
   capturing a first and second frame of a video sequence, the frames having pixel values in rows and columns;
   detecting edges of pixel values of the first and second frames;
   comparing the edges of the first frame with the edges of the second frame;
   determining an energy of lines of pixels of the second frame based on the comparison, the lines corresponding to either rows or columns;
   adjusting the determined energy by reducing the energy of each line that was selected in the first frame by a weighting factor;
   selecting lines having the lowest energy; and
   resizing the second frame using the selected lines having a low determined energy.

13. The medium of claim 12, the operations further comprising repeating capturing, detecting, comparing, determining, adjusting, selecting, and resizing for each additional frame of the video sequence.

14. The medium of claim 12, the operations further comprising sending the resized frame to a video display device.

15. An apparatus comprising:
   means for capturing a first and second frame of a video sequence, the frames having pixel values in rows and columns;

means for detecting edges of pixel values of the first and second frames;

means for comparing the edges of the first frame with the edges of the second frame;

means for determining an energy of lines of pixels of the second frame based on the comparison, the lines corresponding to either rows or columns;

means for adjusting the determined energy by reducing the energy of each line that was selected in the first frame by a weighting factor;

means for selecting lines having the lowest energy; and means for resizing the second frame using the selected lines having a low determined energy.

16. The apparatus of claim 15, wherein the means for resizing resizes by deleting lines.

17. The apparatus of claim 15, wherein the means for resizing resizes by creating additional lines using the selected lines.

18. An apparatus comprising:

a mass storage device to store a first and second frame of a video sequence, the frames having pixel values in rows and columns;

a processing unit to detect edges of pixel values of the first and second frames, to compare the edges of the first frame with the edges of the second frame, to determine an energy of lines of pixels of the second frame based on the comparison, the lines corresponding to either rows or columns, to adjust the determined energy by reducing the energy of each line that was selected in the first frame by a weighting factor, to select lines having the lowest energy, and to resize the second frame using the selected lines having a low determined energy; and an external interface to receive a request for the video sequence and to send the resized frame to a video display device in response to the request.

19. The apparatus of claim 18, wherein the processing unit is further to repeat detecting, comparing, determining, adjusting, selecting, and resizing for each additional frame of the video sequence.

20. The apparatus of claim 18, wherein the processing unit is to resize the second frame by creating two lines to replace each selected line, the pixel values for the created two lines being an average of the pixel values of the selected line with the pixel values of an adjacent line of the second frame.

21. The apparatus of claim 18, wherein determining an energy comprises determining an absolute value of the difference in energy between edges of the first and second frame for each pixel in a line and adding the determined absolute values for each edge having pixels in a single line.

22. The apparatus of claim 18, wherein selecting lines comprises selecting a first line having a lowest energy and increasing the determined energy of lines adjacent to the first line by a second weighting factor.

* * * * *